(12) United States Patent
Lee et al.

(10) Patent No.: US 8,135,420 B2
(45) Date of Patent: *Mar. 13, 2012

(54) METHOD OF TRANSMITTING/RECEIVING A PAGING MESSAGE IN A WIRELESS COMMUNICATION SYSTEM

(75) Inventors: Young Dae Lee, Hanam-si (KR); Sung Duck Chun, Ayang-si (KR); Myung Cheul Jung, Seoul (KR); Sung Jun Park, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 689 days.

This patent is subject to a terminal disclaimer.

(21) Appl. No.: 12/159,841

(22) PCT Filed: Jan. 5, 2007

(86) PCT No.: PCT/KR2007/000078
§ 371 (c)(1),
(2), (4) Date: Oct. 22, 2008

(87) PCT Pub. No.: WO2007/078172
PCT Pub. Date: Jul. 12, 2007

(65) Prior Publication Data
US 2010/0062795 A1 Mar. 11, 2010

Related U.S. Application Data (60) Provisional application No. 60/757,063, filed on Jan. 5, 2006, provisional application No. 60/783,250, filed on Mar. 16, 2006, provisional application No. 60/784,680, filed on Mar. 21, 2006, provisional application No. 60/797,402, filed on May 2, 2006.

(30) Foreign Application Priority Data
Jan. 4, 2007 (KR) .................. 10-2007-0000936

(51) Int. Cl.
*H04W 68/00* (2009.01)
*H04W 72/00* (2009.01)
*H04B 7/00* (2006.01)
(52) U.S. Cl. .................. 455/458; 455/450; 455/515
(58) Field of Classification Search .................. 455/458, 455/447, 450, 515
See application file for complete search history.

(56) References Cited

U.S. PATENT DOCUMENTS
5,659,756 A  8/1997  Hefferon et al.
(Continued)

FOREIGN PATENT DOCUMENTS
CN  1315121  9/2001
(Continued)

OTHER PUBLICATIONS

China Mobile, "RRC States Analysis in LTE," 3GPP TSG RAN WG2#48, R2-052140, Aug. 29, 2005.
(Continued)

*Primary Examiner* — Un C Cho
(74) *Attorney, Agent, or Firm* — Lee, Hong, Degerman, Kang & Waimey (57) ABSTRACT

A method of receiving a paging message at a user equipment (UE) in a wireless communication system in accordance with the present invention comprises receiving from a network paging indication information including a UE identification information and scheduling information for a paging channel (PCH) on which a paging message is transmitted, the scheduling information including allocation information of a time-frequency region through which the paging message is transmitted, obtaining the paging indication information when the UE identification information is identical to an identity of the UE, and receiving from the network the paging message through the time-frequency region indicated by the paging indication information.

14 Claims, 8 Drawing Sheets

U.S. PATENT DOCUMENTS

| | | |
|---|---|---|
| 5,828,677 A | 10/1998 | Sayeed et al. |
| 6,088,342 A | 7/2000 | Cheng et al. |
| 6,138,158 A | 10/2000 | Boyle et al. |
| 6,317,430 B1 | 11/2001 | Knisely et al. |
| 6,330,448 B1 | 12/2001 | Otsuka et al. |
| 6,381,229 B1 | 4/2002 | Narvinger et al. |
| 6,480,525 B1 | 11/2002 | Parsa et al. |
| 6,571,102 B1 | 5/2003 | Hogberg et al. |
| 6,597,668 B1 | 7/2003 | Schafer et al. |
| 6,597,675 B1 | 7/2003 | Esmailzadeh et al. |
| 6,694,148 B1 | 2/2004 | Frodigh et al. |
| 6,717,925 B1 | 4/2004 | Leppisaari et al. |
| 6,728,225 B1 | 4/2004 | Ozluturk |
| 6,785,510 B2 | 8/2004 | Larsen |
| 6,791,963 B1 | 9/2004 | Hwang et al. |
| 6,795,412 B1 | 9/2004 | Lee |
| 6,850,504 B1 | 2/2005 | Cao et al. |
| 6,859,445 B1 | 2/2005 | Moon et al. |
| 6,882,727 B1 | 4/2005 | Vialen et al. |
| 6,907,005 B1 | 6/2005 | Dahlman et al. |
| 6,907,015 B1 | 6/2005 | Moulsley et al. |
| 6,934,550 B2 | 8/2005 | Kearney et al. |
| 6,947,394 B1 | 9/2005 | Johansson et al. |
| 6,950,420 B2 | 9/2005 | Sarkkinen et al. |
| 6,965,580 B1 | 11/2005 | Takagi et al. |
| 7,016,343 B1 | 3/2006 | Mermel et al. |
| 7,031,708 B2 | 4/2006 | Sarkkinen et al. |
| 7,075,971 B2 | 7/2006 | Parsa et al. |
| 7,099,309 B2 | 8/2006 | Davidson |
| 7,145,895 B2 | 12/2006 | Mueckenheim et al. |
| 7,151,758 B2 | 12/2006 | Kumaki et al. |
| RE39,454 E | 1/2007 | Cantoni et al. |
| 7,184,792 B2 | 2/2007 | Mir |
| 7,359,345 B2 | 4/2008 | Chang et al. |
| 7,359,349 B2 | 4/2008 | Kayama et al. |
| 7,376,424 B2 | 5/2008 | Kim et al. |
| 7,385,952 B2 | 6/2008 | Mantha et al. |
| 7,398,108 B2 | 7/2008 | Hondo |
| 7,426,175 B2 | 9/2008 | Zhuang et al. |
| 7,430,206 B2 | 9/2008 | Terry et al. |
| 7,436,801 B1 | 10/2008 | Kanterakis |
| 7,443,816 B2 | 10/2008 | Chen et al. |
| 7,496,113 B2 | 2/2009 | Cai et al. |
| 7,535,886 B2 | 5/2009 | Lee et al. |
| 7,590,089 B2 | 9/2009 | Park et al. |
| 7,664,059 B2 | 2/2010 | Jiang |
| 7,778,599 B2 | 8/2010 | Li et al. |
| 7,826,859 B2 * | 11/2010 | Lee et al. ............... 455/458 |
| 7,848,308 B2 | 12/2010 | Lee et al. |
| 7,881,724 B2 | 2/2011 | Park et al. |
| 2001/0024956 A1 | 9/2001 | You et al. |
| 2001/0046864 A1 | 11/2001 | Bhatoolaul et al. |
| 2002/0009129 A1 | 1/2002 | Choi et al. |
| 2002/0021698 A1 | 2/2002 | Lee et al. |
| 2002/0021714 A1 | 2/2002 | Seguin |
| 2002/0028690 A1 | 3/2002 | McKenna et al. |
| 2002/0032884 A1 | 3/2002 | Kobata et al. |
| 2002/0044527 A1 | 4/2002 | Jiang et al. |
| 2002/0071480 A1 | 6/2002 | Marjelund et al. |
| 2002/0090004 A1 | 7/2002 | Rinchiuso |
| 2002/0093940 A1 | 7/2002 | Toskala et al. |
| 2002/0126629 A1 | 9/2002 | Jiang et al. |
| 2002/0131375 A1 | 9/2002 | Vogel et al. |
| 2002/0160744 A1 | 10/2002 | Choi et al. |
| 2002/0181436 A1 | 12/2002 | Mueckenheim et al. |
| 2002/0187789 A1 | 12/2002 | Diachina et al. |
| 2002/0191559 A1 | 12/2002 | Chen et al. |
| 2003/0003920 A1 | 1/2003 | Sebastian |
| 2003/0007510 A1 | 1/2003 | Yeo et al. |
| 2003/0035440 A1 | 2/2003 | Casaccia et al. |
| 2003/0043741 A1 | 3/2003 | Mukai et al. |
| 2003/0050097 A1 | 3/2003 | Amirijoo et al. |
| 2003/0054829 A1 | 3/2003 | Moisio |
| 2003/0076812 A1 | 4/2003 | Benedittis |
| 2003/0078046 A1 | 4/2003 | Seo |
| 2003/0103476 A1 | 6/2003 | Choi et al. |
| 2003/0131124 A1 | 7/2003 | Yi et al. |
| 2003/0137931 A1 | 7/2003 | Hans et al. |
| 2003/0139170 A1 | 7/2003 | Heo |
| 2003/0147371 A1 | 8/2003 | Choi et al. |
| 2003/0156624 A1 | 8/2003 | Koslar |
| 2003/0210669 A1 | 11/2003 | Vayanos et al. |
| 2003/0223393 A1 | 12/2003 | Lee |
| 2003/0236085 A1 | 12/2003 | Ho |
| 2004/0001452 A1 | 1/2004 | Day et al. |
| 2004/0002334 A1 | 1/2004 | Lee et al. |
| 2004/0004954 A1 | 1/2004 | Terry et al. |
| 2004/0006643 A1 | 1/2004 | Dolson et al. |
| 2004/0008658 A1 | 1/2004 | Dahlman et al. |
| 2004/0008659 A1 | 1/2004 | Kim |
| 2004/0014452 A1 | 1/2004 | Lim et al. |
| 2004/0028078 A1 | 2/2004 | Beckmann et al. |
| 2004/0057387 A1 | 3/2004 | Yi et al. |
| 2004/0077357 A1 | 4/2004 | Nakada |
| 2004/0097192 A1 | 5/2004 | Schiff |
| 2004/0103435 A1 | 5/2004 | Yi et al. |
| 2004/0114606 A1 | 6/2004 | Haddad |
| 2004/0116143 A1 | 6/2004 | Love et al. |
| 2004/0117860 A1 | 6/2004 | Yi et al. |
| 2004/0125772 A9 | 7/2004 | Wu et al. |
| 2004/0127223 A1 | 7/2004 | Li et al. |
| 2004/0143676 A1 | 7/2004 | Baudry et al. |
| 2004/0147266 A1 | 7/2004 | Hwang et al. |
| 2004/0147271 A1 * | 7/2004 | Billon et al. ............ 455/458 |
| 2004/0157602 A1 | 8/2004 | Khawand |
| 2004/0171395 A1 | 9/2004 | Shin |
| 2004/0180675 A1 * | 9/2004 | Choi et al. ............ 455/458 |
| 2004/0184437 A1 | 9/2004 | Lee et al. |
| 2004/0185860 A1 | 9/2004 | Marjelund et al. |
| 2004/0196861 A1 | 10/2004 | Rinchiuso et al. |
| 2004/0198369 A1 | 10/2004 | Kwak et al. |
| 2004/0202140 A1 | 10/2004 | Kim et al. |
| 2004/0208160 A1 | 10/2004 | Petrovic et al. |
| 2004/0219920 A1 | 11/2004 | Love et al. |
| 2004/0229626 A1 | 11/2004 | Yi et al. |
| 2004/0248600 A1 | 12/2004 | Kim |
| 2004/0264497 A1 | 12/2004 | Wang et al. |
| 2004/0264550 A1 | 12/2004 | Dabak |
| 2005/0008035 A1 | 1/2005 | Eklund et al. |
| 2005/0014508 A1 | 1/2005 | Moulsley et al. |
| 2005/0020260 A1 | 1/2005 | Jeong et al. |
| 2005/0025039 A1 | 2/2005 | Hwang et al. |
| 2005/0026623 A1 | 2/2005 | Fisher |
| 2005/0041573 A1 | 2/2005 | Eom et al. |
| 2005/0054368 A1 | 3/2005 | Amerga |
| 2005/0059407 A1 | 3/2005 | Reed et al. |
| 2005/0059421 A1 | 3/2005 | Reed et al. |
| 2005/0063336 A1 | 3/2005 | Kim et al. |
| 2005/0073987 A1 | 4/2005 | Wu |
| 2005/0105482 A1 | 5/2005 | Kobayashi et al. |
| 2005/0107036 A1 | 5/2005 | Song et al. |
| 2005/0118947 A1 | 6/2005 | Ames et al. |
| 2005/0157696 A1 | 7/2005 | Yamamoto |
| 2005/0185608 A1 | 8/2005 | Lee et al. |
| 2005/0190728 A1 | 9/2005 | Han et al. |
| 2005/0197134 A1 | 9/2005 | McKenna et al. |
| 2005/0207374 A1 | 9/2005 | Petrovic et al. |
| 2005/0213605 A1 | 9/2005 | Kim et al. |
| 2005/0243767 A1 | 11/2005 | Zhang et al. |
| 2005/0249141 A1 | 11/2005 | Lee et al. |
| 2005/0249222 A1 | 11/2005 | van Kampen et al. |
| 2005/0260997 A1 | 11/2005 | Korale et al. |
| 2005/0265301 A1 | 12/2005 | Heo et al. |
| 2005/0271025 A1 | 12/2005 | Guethaus et al. |
| 2005/0281212 A1 | 12/2005 | Jeong et al. |
| 2005/0288026 A1 | 12/2005 | Byun et al. |
| 2006/0002367 A1 | 1/2006 | Lee et al. |
| 2006/0007886 A1 | 1/2006 | Lee et al. |
| 2006/0011953 A1 | 1/2006 | Nakahashi et al. |
| 2006/0018289 A1 | 1/2006 | Schulist et al. |
| 2006/0025079 A1 | 2/2006 | Sutskover et al. |
| 2006/0045047 A1 | 3/2006 | Choi et al. |
| 2006/0059186 A1 | 3/2006 | Backlund |
| 2006/0062196 A1 | 3/2006 | Cai et al. |
| 2006/0146745 A1 | 7/2006 | Cai et al. |
| 2006/0153232 A1 | 7/2006 | Shvodian |
| 2006/0168343 A1 | 7/2006 | Ma et al. |

| | | | | | | |
|---|---|---|---|---|---|---|
| 2006/0193282 | A1 | 8/2006 | Ikawa et al. | JP | 2006-14372 | 1/2006 |
| 2006/0256818 | A1 | 11/2006 | Shvodian et al. | JP | 2006-020044 | 1/2006 |
| 2006/0292982 | A1 | 12/2006 | Ye et al. | JP | 2006025437 | 1/2006 |
| 2007/0060146 | A1 | 3/2007 | Won et al. | JP | 2006-505998 | 2/2006 |
| 2007/0099619 | A1 | 5/2007 | Parekh et al. | JP | 2006352705 | 12/2006 |
| 2007/0121543 | A1 | 5/2007 | Kuchibhotla et al. | JP | 2009-284532 | 12/2009 |
| 2007/0135080 | A1 | 6/2007 | Islam et al. | KR | 10-2001-0111634 | 12/2001 |
| 2007/0140115 | A1 | 6/2007 | Bienas et al. | KR | 10-2001-0111637 | 12/2001 |
| 2007/0147326 | A1 | 6/2007 | Chen | KR | 10-2004-0048675 | 6/2004 |
| 2007/0206531 | A1 | 9/2007 | Pajukoski et al. | KR | 10-2004-0064867 | 7/2004 |
| 2008/0031253 | A1 | 2/2008 | Kim et al. | KR | 10-2004-0089937 | 10/2004 |
| 2008/0069031 | A1 | 3/2008 | Zhang et al. | RU | 2168278 | 5/2001 |
| 2008/0095105 | A1 | 4/2008 | Sundberg et al. | RU | 2191479 | 10/2002 |
| 2008/0232291 | A1 | 9/2008 | Hus et al. | RU | 2232469 | 7/2004 |
| 2009/0052388 | A1 | 2/2009 | Kim et al. | RU | 2237380 | 9/2004 |
| 2009/0109912 | A1 | 4/2009 | DiGirolamo et al. | RU | 2232477 | 10/2004 |
| 2009/0163211 | A1 | 6/2009 | Kitazoe et al. | RU | 2263415 | 10/2005 |
| 2009/0175241 | A1 | 7/2009 | Ohta et al. | RU | 2270526 | 2/2006 |
| 2009/0201948 | A1 | 8/2009 | Patwardhan et al. | RU | 2009106289 | 8/2010 |
| 2009/0238141 | A1 | 9/2009 | Damnjanovic et al. | TW | 407407 | 10/2000 |
| 2009/0319850 | A1 | 12/2009 | Baek et al. | TW | 548916 | 8/2003 |
| 2009/0323646 | A1 | 12/2009 | Ketchum et al. | TW | 552815 | 9/2003 |
| 2010/0014430 | A1 | 1/2010 | Oka | TW | 586283 | 5/2004 |
| 2010/0034095 | A1 | 2/2010 | Ho et al. | TW | 589818 | 6/2004 |
| 2010/0103899 | A1 | 4/2010 | Kwak et al. | TW | 590340 | 6/2004 |
| 2010/0105334 | A1 | 4/2010 | Terry et al. | TW | 592412 | 6/2004 |
| | | | | TW | I228008 | 2/2005 |
| FOREIGN PATENT DOCUMENTS | | | | TW | I229268 | 3/2005 |
| CN | | 1411668 | 4/2003 | TW | I229514 | 3/2005 |
| CN | | 1430359 | 7/2003 | TW | 200522579 | 7/2005 |
| CN | | 1565140 | 1/2005 | TW | I237478 | 8/2005 |
| CN | | 1663158 | 8/2005 | TW | I239731 | 9/2005 |
| CN | | 1692661 | 11/2005 | TW | I239756 | 9/2005 |
| DE | | 10337828 | 4/2005 | TW | 1242951 | 11/2005 |
| EP | | 0978958 | 2/2000 | TW | 200536318 | 11/2005 |
| EP | | 1009184 | 6/2000 | TW | 200605549 | 2/2006 |
| EP | | 1041850 | 10/2000 | TW | I253824 | 4/2006 |
| EP | | 1261222 | 11/2002 | WO | 94/09597 | 4/1994 |
| EP | | 1361514 | 11/2003 | WO | 98/47302 | 10/1998 |
| EP | | 1392074 | 2/2004 | WO | 98/49857 | 11/1998 |
| EP | | 1441473 | 7/2004 | WO | 99/44383 | 9/1999 |
| EP | | 1478203 | 11/2004 | WO | 9960729 | 11/1999 |
| EP | | 1496639 | 1/2005 | WO | WO99/63713 | 12/1999 |
| EP | | 1557968 | 7/2005 | WO | 01/05068 | 1/2001 |
| EP | | 1599063 | 11/2005 | WO | 01/05121 | 1/2001 |
| EP | | 1605724 | 12/2005 | WO | 01/35586 | 5/2001 |
| EP | | 1684538 | 7/2006 | WO | 02/03720 | 1/2002 |
| JP | | 6-013959 | 1/1994 | WO | 02/39697 | 5/2002 |
| JP | | 06-121001 | 4/1994 | WO | 2002/43403 | 5/2002 |
| JP | | 9-055693 | 2/1997 | WO | WO02/039760 | 5/2002 |
| JP | | 1997-186704 | 7/1997 | WO | 02/47417 | 6/2002 |
| JP | | 9-327072 | 12/1997 | WO | 2002-075442 | 9/2002 |
| JP | | 11-308671 | 11/1999 | WO | 02-102110 | 12/2002 |
| JP | | 11-331949 | 11/1999 | WO | 03/007636 | 1/2003 |
| JP | | 2000-032088 | 1/2000 | WO | 03017691 | 2/2003 |
| JP | | 2000-151494 | 5/2000 | WO | 03043259 | 5/2003 |
| JP | | 2000-175271 | 6/2000 | WO | 03/047155 | 6/2003 |
| JP | | 2000-184428 | 6/2000 | WO | 03/055142 | 7/2003 |
| JP | | 2001-95031 | 4/2001 | WO | 03/056723 | 7/2003 |
| JP | | 2001-298770 | 10/2001 | WO | 03/087978 | 10/2003 |
| JP | | 2002-135231 | 5/2002 | WO | 03/096571 | 11/2003 |
| JP | | 2002-374321 | 12/2002 | WO | 2004/030393 | 4/2004 |
| JP | | 2003-008635 | 1/2003 | WO | WO2004/034656 | 4/2004 |
| JP | | 2003-116172 | 4/2003 | WO | 2004045234 | 5/2004 |
| JP | | 2003174470 | 6/2003 | WO | 2004/075442 | 9/2004 |
| JP | | 2003333661 | 11/2003 | WO | 2004-089030 | 10/2004 |
| JP | | 2004-128967 | 4/2004 | WO | 2004/091130 | 10/2004 |
| JP | | 2004-320165 | 11/2004 | WO | 2005/006660 | 1/2005 |
| JP | | 2004312771 | 11/2004 | WO | 2005/018269 | 2/2005 |
| JP | | 2004-349884 | 12/2004 | WO | 2005/034418 | 4/2005 |
| JP | | 2005-517369 | 6/2005 | WO | 2005/036917 | 4/2005 |
| JP | | 2005217743 | 8/2005 | WO | 2005055472 | 6/2005 |
| JP | | 2005525066 | 8/2005 | WO | 2005074312 | 8/2005 |
| JP | | 2005-236988 | 9/2005 | WO | 2005088886 | 9/2005 |
| JP | | 2005-237013 | 9/2005 | WO | 2005-099125 | 10/2005 |
| JP | | 2005-244958 | 9/2005 | WO | 2005/109695 | 11/2005 |
| JP | | 2005278167 | 10/2005 | WO | 2005/109837 | 11/2005 |
| JP | | 2005-536168 | 11/2005 | WO | 2005/117317 | 12/2005 |
| JP | | 2005-539462 | 12/2005 | WO | 2005-125125 | 12/2005 |

| | | |
|---|---|---|
| WO | 2005119941 | 12/2005 |
| WO | 2006/012946 | 2/2006 |
| WO | 2006/033552 | 3/2006 |
| WO | 2007/095966 | 8/2007 |

OTHER PUBLICATIONS

Panasonic, "E-UTRA Transport and Logical Channels," 3GPP TSG RAN WG2#49, R2-052860, Nov. 7, 2005.
Siemens, "States in E-UTRAN," 3GPP TSG-RAN WG RAN2#48, R2-052501, Aug. 29, 2005.
Qualcomm Europe, "Signaling Optimization for E-UTRAN," 3GPP TSG-RAN WG2 Meeting #48-bis, R2-052407, Oct. 10, 2005.
Haardt, M., et al., "The TD-CDMA Based UTRA TDD Mode," IEEE Journal on Selected Areas in Communications, vol. 18, No. 8, pp. 1375-1385, Aug. 2000.
Motorola: "Paging Channel Design for E-UTRA", 3GPP TSG-RAN WG1,R1-061712 [online] Jun. 27, 2006.
Sarka, S. et al.: Common-Channel Soft Handoff in cdma2000—The Paging Channel. IEEE Transactions on Microwave Theory and Techniques. Jun. 2000.
NTT Docomo, et al: "Paging Channel Structure for E-UTRA Downlink", 3GPP TSG-RAN WG1, R1-060034 [online], Jan. 23, 2006.
Phillips: "Envolved Paging Indicators for LTE"; 3GPP TSG-RAN WG2 Meeting #49, Seoul, Korea, Nov. 7-11, 2005.
LG Electronics Inc.: "Framing in the MAC entity", 3GPP TSG-RAN WG2 #52 R2-061012, Mar. 27-31, 2006, Athens, Greece.
LG Electronics Inc.: "HARQ and ARQ Operation"; 3GPP TSG-Ran WG2 #50, R2-060106, Jan. 9-13, 2006, Sophia Antipolis, France.
Huawei: "Further considerations on multiplexing method of shared Control Channel in Uplink Single-Carrier FDMA", TSG-RAN WG1#43, R1-051430; Seoul Korea, Nov. 7-11, 2005.
NTT Docomo et al. "Multiplexing method of shared control channeil in uplink single-carrier FDMA radio access" TSG-RAN WG1 #42bis, R1-051143, Oct. 14, 2005.
Xu, H., et al.; "Performance Analysis on the Radio Link Control Protocol of UMTS System"; 2002 IEEE 56th Vehicular Technology Conference Proceedings; pp. 2026-2030; Sep. 2002.
LG Electronics Inc., "UE state transition in LTE_ACTIVE," 3GPP TSG-RAN WG2 #52, R2-061002, Mar. 27, 2006, XP050130928.
Ericsson, "LTE States in E-UTRAN," 3GPP TSG-RAN WG2 Meeting #48bis, R2-052425, Oct. 10, 2005, XP050129534.
Motorola et al., "MAC-e/es header and functional split," R2-042360, 3GPP TSG RAN WG2 Meeting#45, Nov. 2004.
Ericsson, "User plane protocol enhancements," R2-052749, TSG-RAN WG2 Meeting #48bis, Oct. 2005.
LG Electronics Inc., "MAC Enhancement," R2-060561, 3GPP TSG-RAN WG2 #51, Feb. 2006.
Qualcomm, "Need for MAC-hs segmentation mechanism," R2-020769, 3GPP TSG-RAN WG2 Meeting #28, Apr. 2002.
3rd Generation Partnership Project (3GPP), "LTE; Evolved Universal Terrestrial Radio Access (E-UTRA) Medium Access Control (MAC) Protocol Specification (Release 8)," 3GPP TS 36.321 v8.4.0, Jan. 2009.
Zdarsky, F.A., et al.,"Handover in Mobile Communication Networks: Who Is In Control Anyway?", Proceedings of the 30th Annual EUROMICRO Conference, Aug. 31, 2004, XP10723593.
Ericsson, "E-UTRA Random Access," 3GPP TSG-RAN WG1, R1-051445, XP003020958, Nov. 7, 2005.
Derryberry, R.T., et al.,"On CDMA 2000 Evolution—Reverse High-Speed Packet Data Physical Layer Enhancements in CDMA 2000 1xEV-DV," IEEE Communications Magazine, vol. 43, Issue 4, pp. 41-47, XP001228792, Apr. 18, 2005.
Chung, J., et al.,"Packet Synchronization and Identification for Incremental Redundancy Transmission in FH-CDMA Systems," 3rd IEEE International Symposium on Personal, Indoor and Mobile Radio Communications, pp. 292-295, XP010107082, Oct. 19, 1992.
Qualcomm, "Need for MAC-hs segmentation mechanism," 3GPP TSG-RAN WG2 meeting #28, R2-020769, Apr. 2002.
Ericsson, "Solution for sending NAS together with RRC connection request," R2-071817, 3GPP TSG-RAN WG2#58, May 2007.
LG Electronics Inc., "Default SRB for initial access," R2-061958, 3GPP TSG-RAN WG2 LTE Ad-hoc, Jun. 2006.
3rd Generation Partnership Project (3GPP), "Universal Mobile Telecommunications System (UMTS); Radio Resource Control (RRC) protocol specification (3GPP TS 25.331 version 6.8.0 Release 6)," ETSI TS 125 331, Dec. 2005.
IPWireless, "Layer 2 functions for LTE," R2-052377, 3GPP TSG RAN WG2 #48bis, Oct. 2005.
LG Electronics Inc., "MAC Architecture of LTE," R2-060105, 3GPP TSG-RAN WG2 #50, Jan. 2006.
LG Electronics Inc., "HARQ and ARQ Operation," R2-060563, 3GPP TSG-RAN WG2 #51, Feb. 2006.
LG Electronics Inc., "Discussion on RLC PDU Structure," R2-070721, 3GPP TSG-RAN WG2 #57, Feb. 2007.
3rd Generation Partnership Project (3GPP), "Technical Specification Group Radio Access Network; Introduction of the Multimedia Broadcast Multicast Service (MBMS) in the Radio Access Network (RAN); Stage 2 (Release 6)," 3GPP TS 25.346 V6.7.0, Dec. 2005.

* cited by examiner

Sub-frame

FIG. 6B

Sub-frame

METHOD OF TRANSMITTING/RECEIVING A PAGING MESSAGE IN A WIRELESS COMMUNICATION SYSTEM

CROSS-REFERENCE TO RELATED APPLICATIONS

This application is the National Stage filing under 35 U.S.C. 371 of International Application No. PCT/KR2007/000078, filed on Jan. 5, 2007, which claims the benefit of earlier filing date and right of priority to Korean Application No. 10-2007-0000936, filed on Jan. 4, 2007, and also claims the benefit of U.S. Provisional Application Serial Nos. 60/797,402, filed on May 2, 2006, 60/784,680, filed on Mar. 21, 2006, 60/783,250, filed on Mar. 16, 2006, and 60/757,063, filed on Jan. 5, 2006.

TECHNICAL FIELD

The present invention relates to a wireless communication system, more particularly, to a method of transmitting/receiving a paging message in a wireless communication system.

BACKGROUND ART

A paging procedure in a mobile communication system is needed when a network calls a user equipment (UE) or a plurality of UEs. Paging Type 1 and Paging Type 2 messages are used in the Universal Mobile Telecommunications System (UMTS).

The Paging Type 1 message is used when a UE is an idle mode, a Cell_PCH or a URA_PCH. A core network (CN) calls a UE in an idle mode for establishing a signaling connection or requesting an establishment of a call or session with the UE. A UE in a Cell_PCH or URA_PCH can be paged to execute a cell update or URA (UTRAN Registration Area) update procedure. In addition, the Paging Type 1 message can be used for the UTRAN to request a UE to read updated system information. All UEs in a cell are paged since the updated system information is important for the all UEs. A UE identity is included in a paging message for identifying a UE, which is high level UE identity such as an IMSI (International Mobile Subscriber Identity), TMSI (Temporary Mobile Subscriber Identity) or P-TMSI (Packet Temporary Mobile Subscriber Identity) for a UE in an idle state and which is a U-RNTI (UTRAN Radio Network Temporary Identifier) for a UE in a connected mode.

The Paging Type 2 message is used when a UE in the Cell_DCH or Cell FACH is additionally paged via a pre-established RRC connection. A dedicated paging for a specific UE is possible because the pre-established RRC connection is used.

The paging message is paired with paging indication (PI) to be transmitted on a transport channel PCH (paging channel). When a UE is paged, the UTRAN transmits the paging indication to the UE on a paging indication channel (PICH) to inform the UE that a paging message will be transmitted. The UE may receive the paging message on the PCH when a pre-determined period is elapsed after receiving the paging indication.

In the related art, radio resources for transmitting the paging message are fixed. For example, the paging indication is transmitted on a PICH having a spreading factor (SF) of 256 and the PCH including a paging message is transmitted on a S-CCPCH in the UMTS. When the paging message is transmitted through the fixed radio resources, the network cannot have flexibility for scheduling of data transmission so that it becomes hard to be applicable to the change of radio environment. Further, when a UE located in a cell boundary is paged, a paging procedure is not able to be smoothly performed since reception errors increases as a distance between the UE and an eNB is getting larger.

DISCLOSURE OF INVENTION

Accordingly, the present invention is directed to a method of transmitting/receiving a paging message in a wireless communication system that substantially obviates one or more of the problems due to limitations and disadvantages of the related art.

An object of the present invention is to provide to a method of transmitting/receiving a paging message, in which a paging message is dynamically allocated on a radio resource based on paging indication and the same paging message transmitted from multiple cells is combined by a UE so that the scheduler can have more flexibility of scheduling and the paging message can be more correctly received near a cell edge.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method of receiving a paging message at a user equipment (UE) in a wireless communication system, the method comprising receiving from a network paging indication information including a UE identification information and scheduling information for a paging channel (PCH) on which a paging message is transmitted, the scheduling information including allocation information of a time-frequency region through which the paging message is transmitted, obtaining the paging indication information when the UE identification information is identical to an identity of the UE, and receiving from the network the paging message through the time-frequency region indicated by the paging indication information.

In accordance with another embodiment of the present invention, a method of transmitting a paging message to a user equipment (UE) in a wireless communication system, the method comprising transmitting to the UE paging indication information including a UE identification information and scheduling information for a paging channel (PCH) on which a paging message is transmitted, the scheduling information including allocation information of a time-frequency region through which the paging message is transmitted, and transmitting the paging message through the time-frequency region indicated by the paging indication information.

In accordance with another embodiment of the present invention, a method of receiving a paging message at a user equipment (UE) in a wireless communication system, the method comprising, receiving from a network paging indication information including a UE identification information and scheduling information for a paging channel (PCH) on which a paging message is transmitted, obtaining the paging indication information when the UE identification information is identical to an identity of the UE, and receiving a paging message using the paging indication information by combining a plurality of paging channels from a plurality of cells.

In accordance with another embodiment of the present invention, a method of receiving at least one paging message on a paging channel, the method comprising receiving paging indication on L1/L2 control signaling, checking whether there is a short identity corresponding to a user equipment (UE) in the paging indication, and receiving a paging message having a long identity on a radio resource indicated by the paging indication in case that there is the sort identity.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
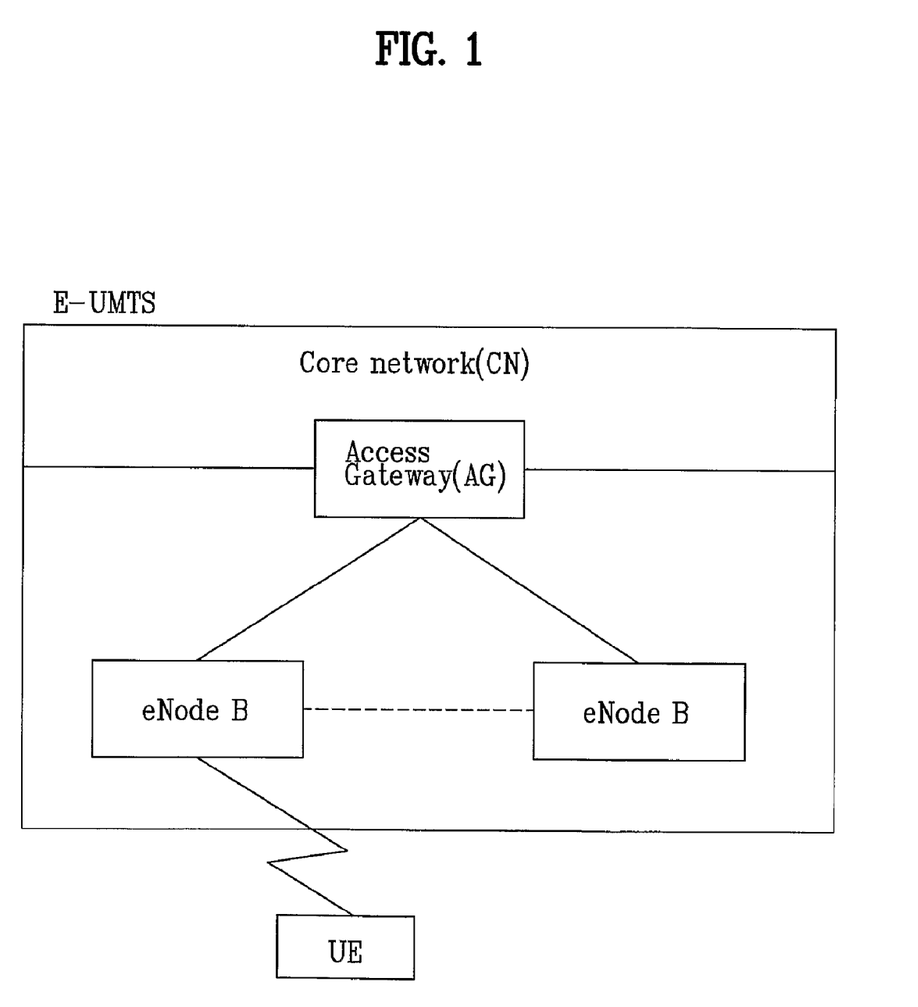
FIG. 1 is a block diagram of a network structure of E-UMTS (evolved universal mobile telecommunications system)

FIG. 1 is a block diagram of a network structure of an E-UMTS (Evolved-Universal Mobile Telecommunications System) to which technical features of the present invention are applied. An E-UMTS is a system evolving from the conventional UMTS and its basic standardization is currently handled by the 3GPP ($3^{rd}$ Generation Partnership Project). The E-UMTS can also be called an LTE (Long Term Evolution) system.

Referring to FIG. 1, an E-UMTS network includes a user equipment (hereinafter abbreviated 'UE'), a base station (hereinafter named 'eNode B' or 'eNB') and an access gateway (hereinafter abbreviated 'aGW') connected to an external network by being located at an end of the E-UMTS network. The aGW may be classified into a part for handling user traffic and a part for handling control traffic. A first aGW for processing new user traffic may communicate with a second AG for processing control traffic via a new interface. A eNode-B may include at least one cell. A first interface for transmitting user traffic or a second interface for transmitting control traffic may be located between several eNode-Bs. The CN may include the aGW and a plurality of nodes for registering users of User Equipments (UEs). If required, another interface for discriminating between the E-UTRAN and the CN may also be used for the LTE network. The aGW manages mobility of a UE by unit of a tracking area (TA). A TA comprises a plurality of cells. When a UE moves into a TA from another TA, the UE informs the aGW of the change of the TAs. The eNode B includes at least one cell.

Figure 2:
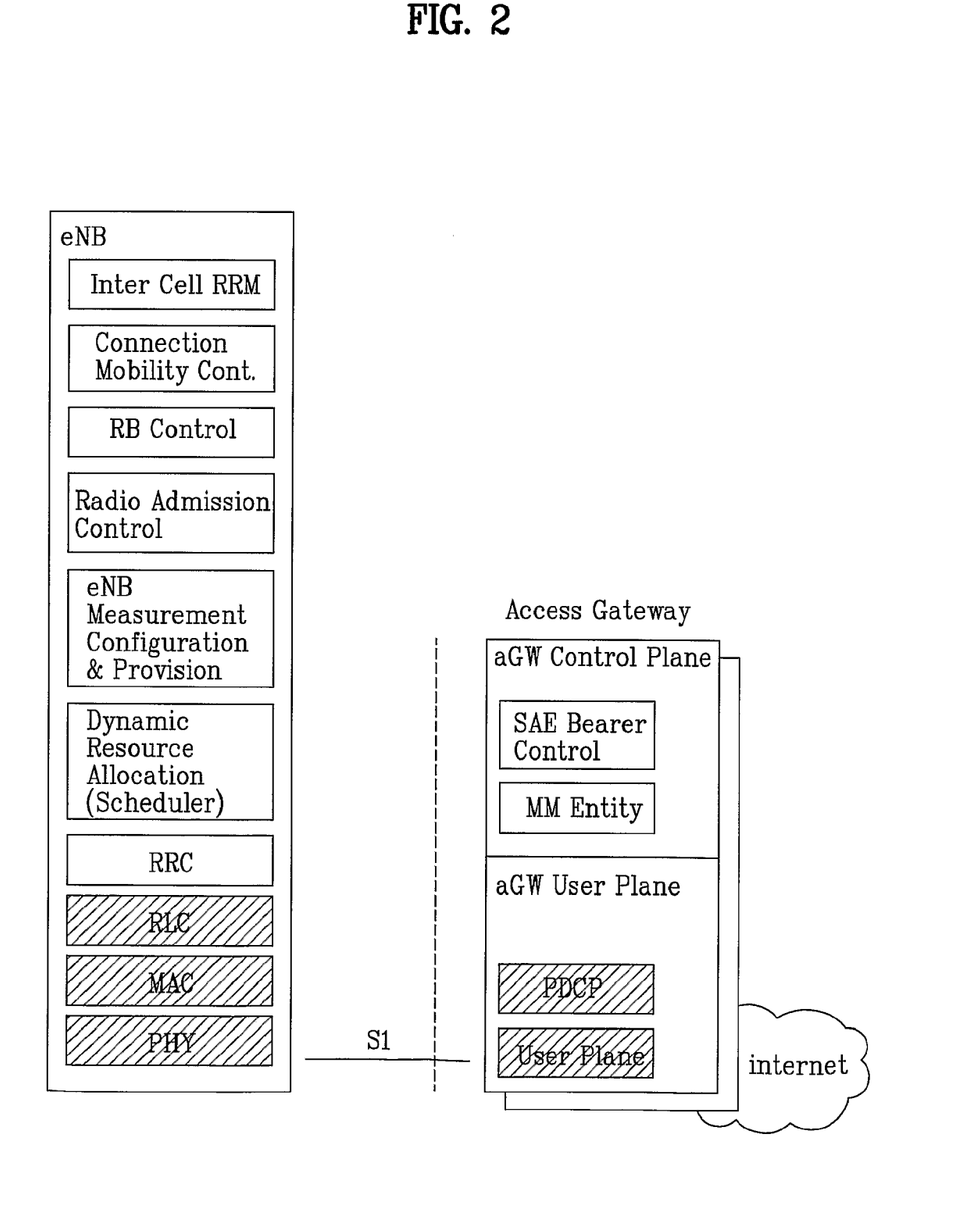
FIG. 2 is a schematic diagram illustrating a protocol architecture of an E-UTRAN.

FIG. 2 is a schematic diagram illustrating protocol architecture of an E-UTRAN. In FIG. 2, the hatching part represents functional entities of a control plane and the non-hatching part represents functional entities of a user plane.

Layers of a radio interface protocol between a UE and a network can be classified into a first layer L1, a second layer L2 and a third layer L3 based on three lower layers of OSI (open system interconnection) reference model widely known in communication systems. A physical layer belonging to the first layer L1 provides an information transfer service using a physical channel. A radio resource control (hereinafter abbreviated 'RRC') located at the third layer plays a role in controlling radio resources between the UE and the network. For this, the RRC layer enables RRC messages to be exchanged between the UE and the network. The RRC layer can be distributively located at network nodes including an eNode B, an AG and the like or at either the Node B or the AG.

Figure 3A:
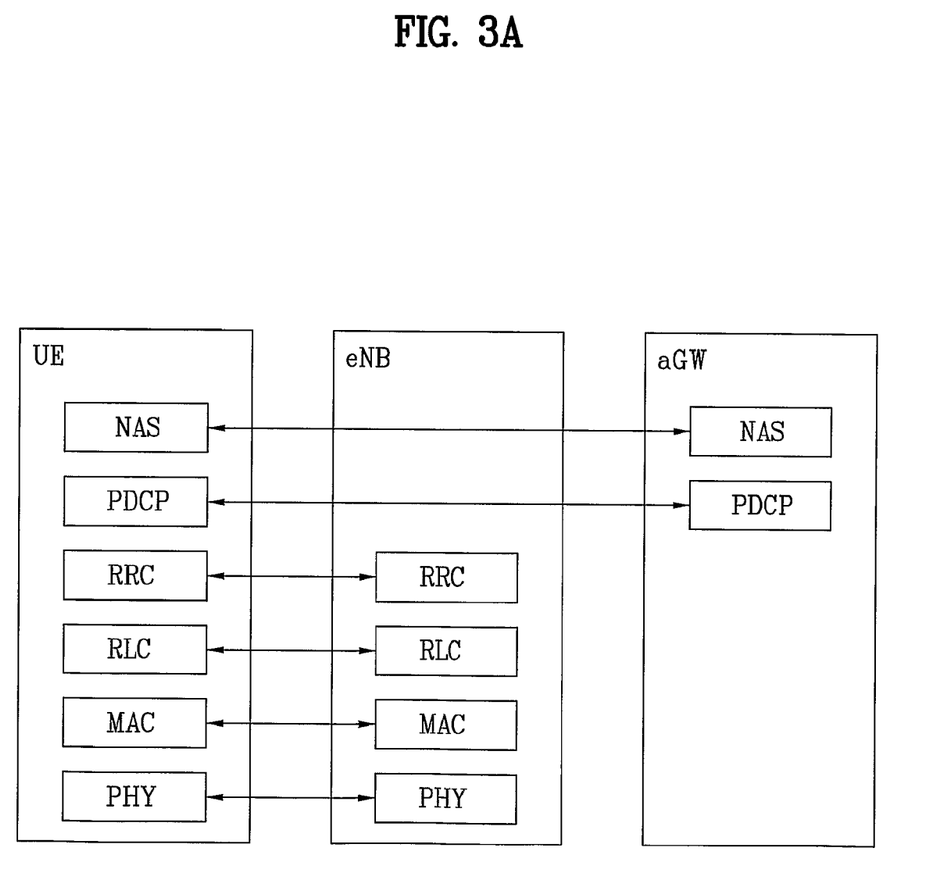
FIGS. 3A and 3B are architectural diagrams of a control plane and a user plane, respectively of a radio interface protocol between UE (user equipment) and UTRAN (UMTS terrestrial radio access network) based on the 3GPP radio access network standard.
Figure 3B:
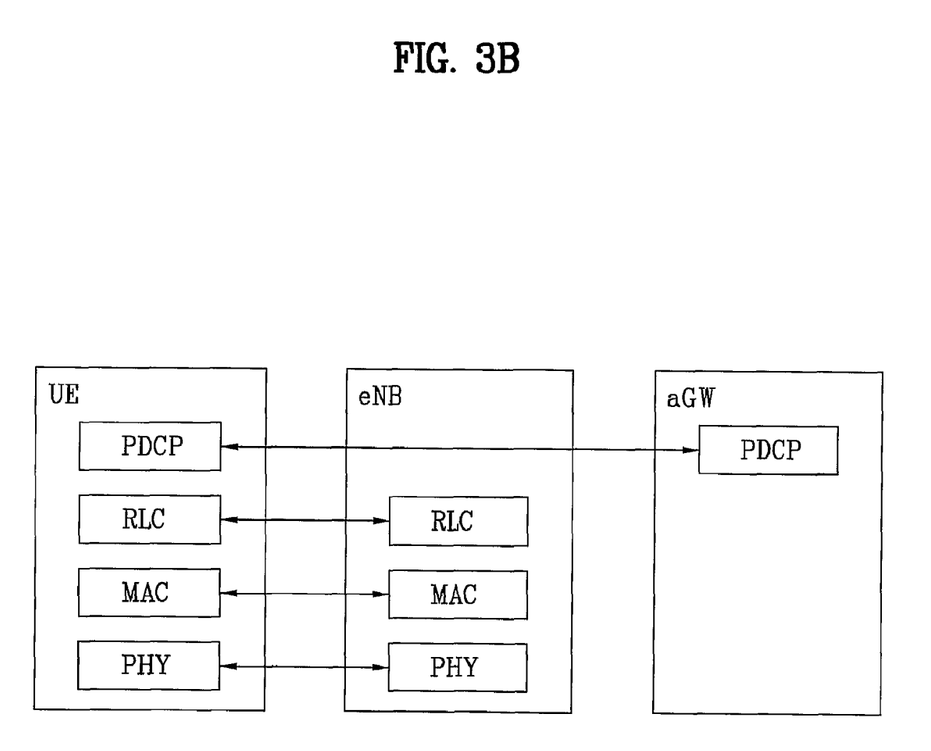

FIGS. 3A and 3B are architectural diagrams of a control plane and a user plane, respectively of a radio interface protocol between UE (user equipment) and UTRAN (UMTS terrestrial radio access network) based on the 3GPP radio access network standard. Referring to FIG. 3A, a radio interface protocol vertically includes a physical layer, a data link layer, and a network layer and horizontally includes a user plane for data information transfer and a control plane for signaling transfer. The protocol layers in FIG. 3A can be classified into L1 (first layer), L2 (second layer), and L3 (third layer) based on three lower layers of the open system interconnection (OSI) standard model widely known in the communications systems.

The respective layers of a radio protocol control plane shown in FIG. 3A and a radio protocol user plane shown in FIG. 3B are explained as follows.

First of all, the physical layer as the first layer provides information transfer service to an upper layer using physical channels. The physical layer (PHY) is connected to a medium access control (hereinafter abbreviated 'MAC') layer above the physical layer via transport channels. Data are transferred between the medium access control layer and the physical layer via the transport channels. Moreover, data is transferred between different physical layers, and more particularly, between one physical layer of a transmitting side and the other physical layer of a receiving side via the physical channels. A downlink physical channel of the E-UMTS is modulated according to an orthogonal frequency division multiplexing (OFDM) scheme and time and frequency are used as radio resources.

The medium access control (hereinafter abbreviated 'MAC') layer of the second layer provides a service to a radio link control (hereinafter abbreviated RLC) layer above the MAC layer via logical channels. The RLC layer of the second layer supports reliable data transfer. In order to effectively transmit IP packets (e.g., IPv4 or IPv6) within a radio-communication period having a narrow bandwidth, a PDCP layer of the second layer (L2) performs header compression to reduce the size of a relatively-large IP packet header containing unnecessary control information.

A radio resource control (hereinafter abbreviated 'RRC') layer located on a lowest part of the third layer is defined in the control plane only and is associated with configuration, reconfiguration and release of radio bearers (hereinafter abbreviated 'RBs') to be in charge of controlling the logical, transport and physical channels. In this case, the RB means a service provided by the second layer for the data transfer between the UE and the UTRAN.

As a downlink transport channel carrying data to UEs from the network, there is a broadcast channel (BCH) carrying system information and a downlink shared channel (SCH) carrying user traffic or control messages. The traffic or control messages of a downlink multicast or broadcast service can be transmitted via the downlink SCH or an additional downlink multicast channel (MCH). Meanwhile, as an uplink transport channel carrying data to the network from UEs, there is a random access channel (RACH) carrying an initial control message and a uplink shared channel (UL-SCH) carrying user traffic or control message.

In the E-UMTS system, an OFDM is used on the downlink and a single carrier frequency division multiple access (SC-FDMA) on the uplink. The OFDM scheme using multiple carriers allocates resources by unit of multiple subcarriers including a group of carriers and utilizes an orthogonal frequency division multiple access (OFDMA) as an access scheme.

A physical layer of an OFDM or OFDMA scheme divides active carriers into a plurality of groups and transmits each group to a different receiving side. Radio resource allocated to each UE which is defined as a time-frequency region on a two-dimensional sphere comprises continuous subcarriers on a frequency axis and symbols on a time axis. A time-frequency region in the OFDM or OFDMA scheme is a rectangular form sectioned by time and frequency coordinates. One or more time-frequency region can be allocated to an uplink for a UE and an eNB can transmit one or more time-frequency region to a UE. In order to define a time-frequency region on the two-dimensional sphere, the number of OFDM symbols and subcarriers starting from a point having an offset from a reference point should be given.

The E-UMTS uses 10 ms radio frame comprising 20 sub-frames. Namely, a sub-frame is 0.5 ms length. A resource block comprises one sub-frame and twelve subcarriers, each of which is 15 kHz. One sub-frame comprises a plurality of OFDM symbols and a part of the plurality of OFDM symbols can be used for L1/2 control information.

Figure 4:
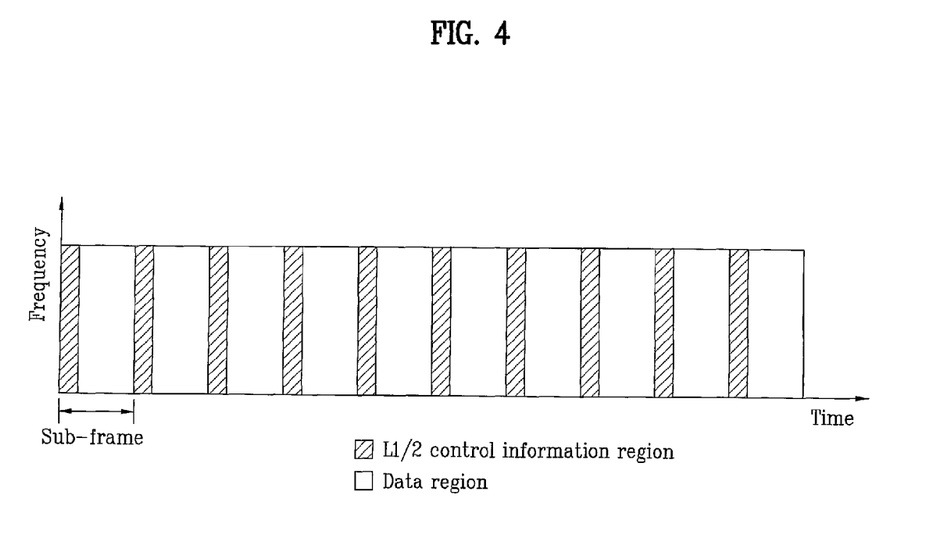
FIG. 4 is a diagram illustrating a structure of physical channels in the E-UMTS.

FIG. 4 is a diagram illustrating a structure of physical channels in the E-UMTS. In FIG. 4, a sub-frame comprises a L1/2 control information transmission region (the hatching part) and a data transmission region (the non-hatching part).

Figure 5:
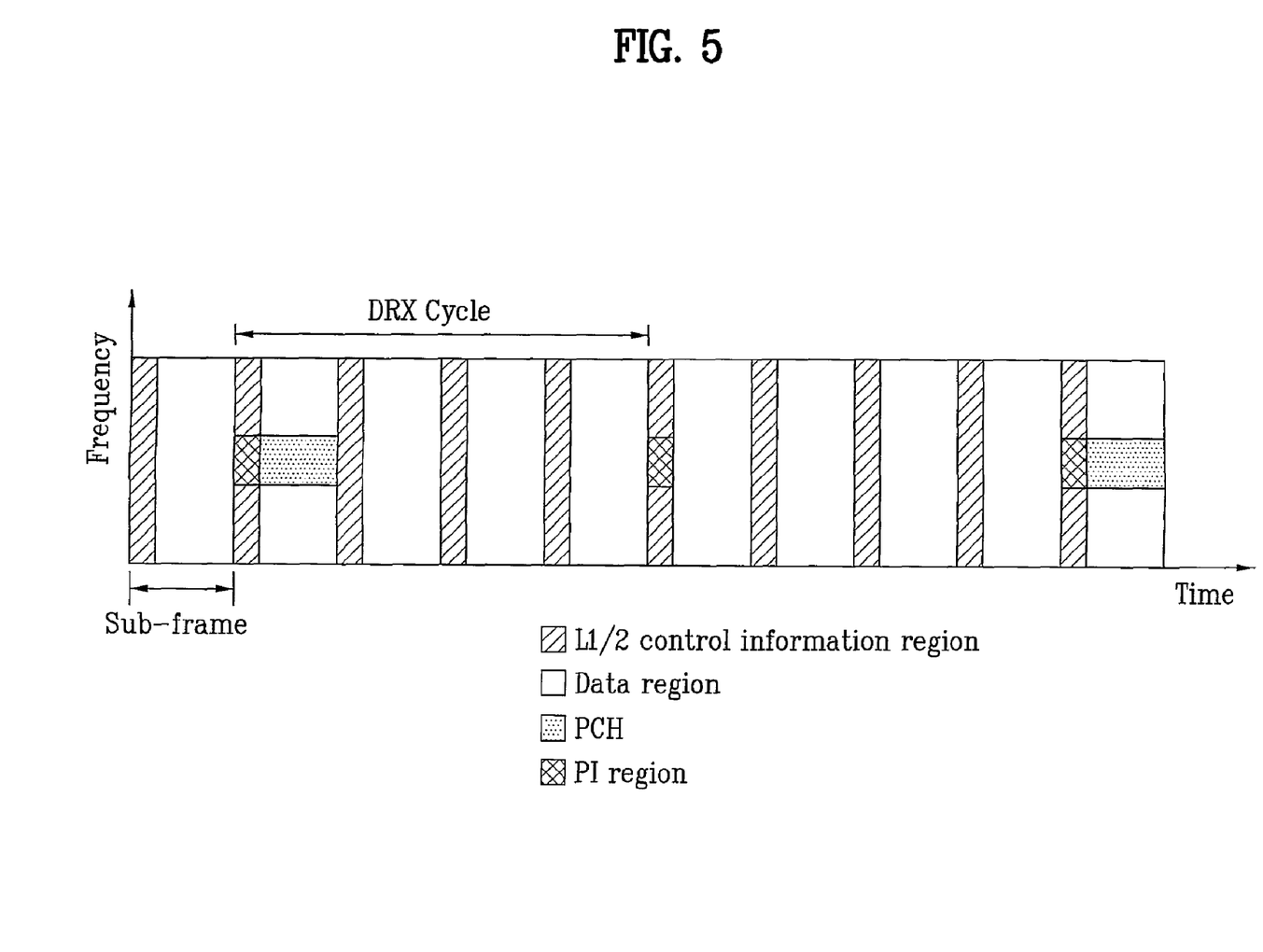
FIG. 5 is a diagram illustrating sub-frames in accordance with a preferred embodiment of the present invention.

FIG. 5 is a diagram illustrating sub-frames in accordance with a preferred embodiment of the present invention.

Referring to FIG. 5, a discontinuous reception (DRX) scheme is applied to a UE in an idle mode or an RRC connection state. The UE wakes up at a paging occasion which is pre-defined by system information from an E-UTRAN within a DRX cycle and monitors whether a paging message is transmitted to the UE. In FIG. 5, one DRX cycle comprises five sub-frames and the paging occasion for the UE starts at the first sub-frame. The UE receives a L1/2 control information transmission region and checks whether paging indication information for the UE is transmitted.

The paging indication information includes UE identification information and information associated with radio resource, i.e. a time-frequency region through which a paging message is transmitted. When realizing that the UE identification information in the paging indication information is identical to the UE identity of the UE, the UE receives the paging message on a paging channel (PCH) of the time-frequency region indicated by the paging indication information.

A paging procedure of a UE in an idle mode and a DRX procedure of a UE in an RRC connection mode should be distinguished. Table 1 describes the differences between the paging procedure and the DRX procedure.

TABLE 1

|  | Paging procedure | DRX procedure |
| --- | --- | --- |
| RRC mode | Idle mode | Connected mode |
| Controlling network node | aGW: paging initiation eNB: paging transmission | eNB |
| Signalled Area | A TA (Tracking Area) | A cell |
| UE identity | A long identity (e.g. IMSI, TMSI) allocated by NAS | A short identity (ex. C-RNTI) allocated by AS in eNB |

The paging procedure is initiated by an aGW for finding a cell location of a UE within a tracking area (TA) and for managing battery consumption efficiently. The paging procedure is applied to a UE in an idle mode. Since the UE in the idle mode has no short UE identity allocated by a cell, a long UE identity like IMSI or TMSI, etc is included in the paging message.

The DRX procedure is performed by an eNB for a RRC connected UE in order to save a battery of the UE. The DRX procedure can be applied when uplink and downlink traffic is temporarily inactive. Since the RRC connected UE has a short UE identity like C-RNTI (Cell Radio Network Temporary Identifier) allocate by a cell, the eNB enables the RRC connected UE to wake up by including the short UE identity in L1/2 control information.

In case of the DRX procedure, a short UE identity having a length equal to or smaller than 16 bits can be easily included in an L1/2 control channel. On the other hand, a paging message having a long UE identity is not able to be included in the L1/2 control channel. Paging indication information in which the short UE identity is included can be included in the L1/2 control information or a paging indication channel (PICH).

In one preferred embodiment of the present invention, a UE in the idle mode monitors a paging channel (PCH) using a long UE identity. An RRC connected UE monitors L1/2 control information using a short UE identity within a DRX cycle. If the RRC connected UE in the DRX mode is scheduled, an eNB will insert the short UE identity of the UE into L1/2 control information including scheduling information with a pre-defined cycle. If an RRC connected UE in the DRX mode is not scheduled, the eNB will not insert the short UE identity of the UE into the L1/2 control information.

In one preferred embodiment of the present invention, an eNB schedules a paging channel (PCH) as well as a downlink shared channel (DL SCH) at a UE specific paging occasion within every paging DRX cycle. Paging indication information informs the UE of whether a paging message for the UE is scheduled within the paging occasion. The paging indication information includes information associated with time-frequency region allocated for the paging message like SCH scheduling.

The paging indication information may be transmitted by a frequency hopping scheme for frequency diversity. For example, the paging indication information can be transmitted on different sub-carriers in different time interval i.e. different paging occasions. Hopping information i.e. how the paging indication is transmitted on different sub-carriers in different paging occasions is included in system information in a cell to be transmitted.

In one preferred embodiment of the present invention, the paging indication information for a UE in the idle mode and a UE in the RRC connection mode can be included in the L1/2 control channel to be transmitted using a short UE identity. In this case, the UEs monitor the L1/2 channel notwithstanding the state of the UEs.

Figure 6A:
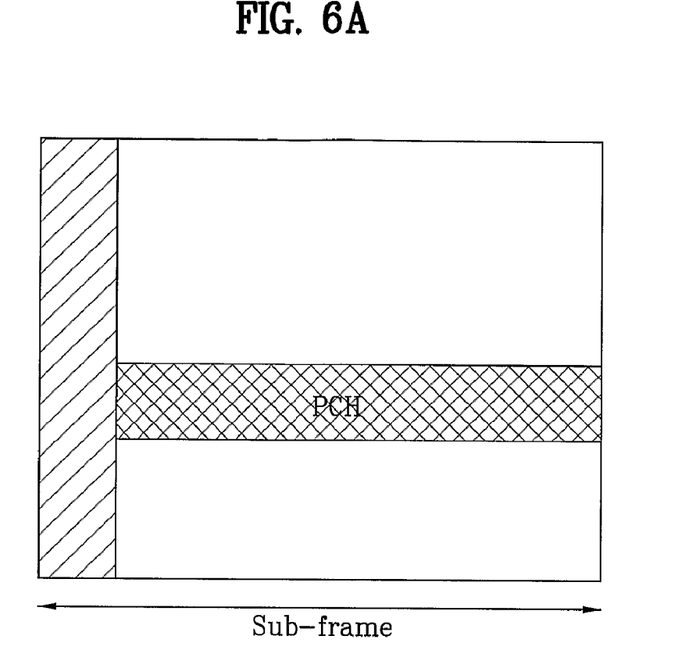
FIGS. 6A and 6B are diagrams for illustrating another preferred embodiments of the present invention.
Figure 6B:
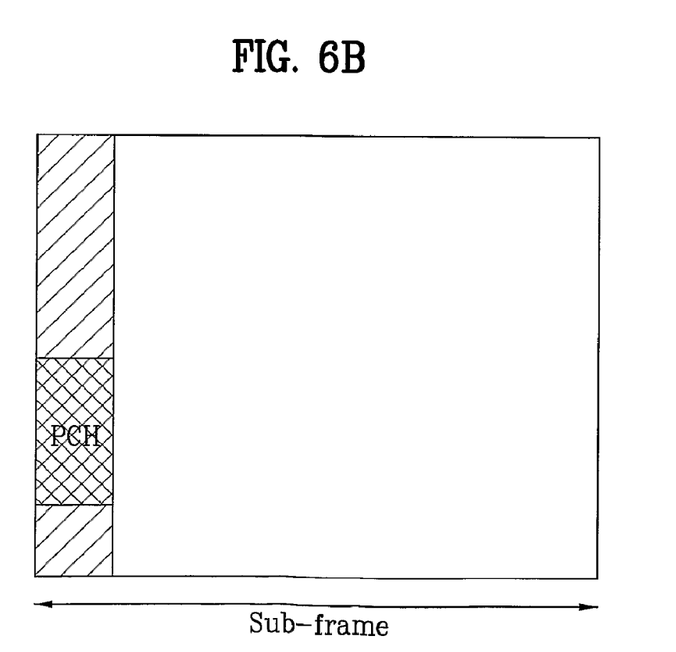

FIGS. 6A and 6B are diagrams for illustrating another preferred embodiments of the present invention. A paging message is transmitted on a paging channel (PCH) in one sub-frame without transmitting paging indication information in the embodiments of FIGS. 6A and 6B. In FIG. 6A, the paging message is transmitted through a data transmission region without the paging indication information on which L1/2 control information is not transmitted. A UE obtains information on a time-frequency region through which the paging channel (PCH) is transmitted and then receives the paging message on the paging channel (PCH) using the time-frequency information.

In FIG. 6B, the paging message (PCH) is transmitted the L1/2 control information transmission region without the paging indication information. A UE also obtains information on a time-frequency region through which the paging channel (PCH) is transmitted and then receives the paging message on the paging channel (PCH) using the time-frequency information.

Figure 7A:
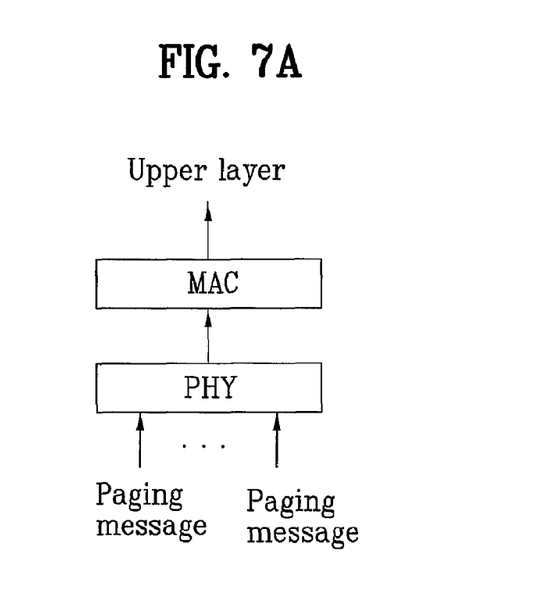
FIG. 7A and FIG. 7B are diagrams illustrating another preferred embodiments of the present invention.
Figure 7B:
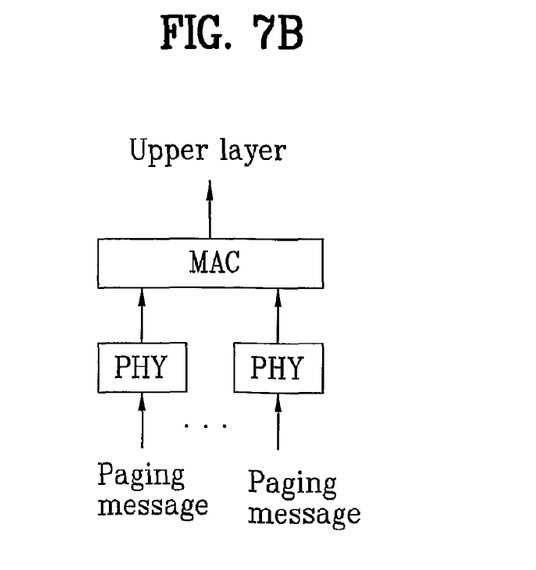

FIG. 7A and FIG. 7B are diagrams illustrating another preferred embodiments of the present invention. A UE located at a cell boundary area can use a combining scheme for optimizing reception of a paging message and/or paging indication information, since an identical paging message and/or paging indication information is transmitted to the UE from a plurality of cells included in one tracking area (TA). The combining scheme can be classified into a soft combining scheme and a selective combining scheme. FIGS. 7A and 7B illustrate embodiments according to the soft combining scheme and the selective combining scheme, respectively.

Referring to FIG. 7A, in case of the soft combining scheme, a physical layer (Layer 1) of a UE receives paging messages from a plurality of cells included in one tracking area (TA) and combines the paging messages. The combined data by the physical layer is transferred to an upper layer via a medium access control (MAC) layer. The UE is able to combine paging indication information transmitted from a plurality of cells by the soft combining scheme.

Referring to FIG. 7B, in case of the selective combining scheme, the physical layer (Layer 1) of the UE receives paging channels (PCHs) from a plurality of cells separately. The Layer 2, e.g. the MAC layer of the UE combines the paging channels transferred from the physical layer and then transfers the combined data to the upper layer.

A cell may be included in a plurality of tracking areas (TAs). In this case, it is necessary that a plurality of paging control channels (PCCHs) and paging channels (PCHs) be configured in the cell. Namely, a paging control channel and a paging channel is configured for each tracking area. Accordingly, the UE needs to select a PCCH and a PCH among the plurality of PCCHs and PCHs based on the tracking area and receive the selected PCCH and PCH.

In particular, in case of the selective combining, L2 sequence numbers for the PCH need to be provided by aGW to support the selective combining in the Layer 2 of the UE. Thus, different sequence numbers are necessary for different tracking area. The sequence number can be added to a data unit carrying a paging message or a paging message itself. When the UE receives a paging channel (PCH), the Layer 2 of the UE arranges the data unit or the paging message received on the PCH based on the sequence number. If the Layer 2 of the UE finds duplicated data units or paging messages having the same sequence number, the Layer 2 of the UE chooses only one of them which are correctly received, sends it to the upper layer and discard the other.

Alternatively, the UE can combine cells included in a eNB to receive a paging channel (PCH). Information associated with cells which can be combined to receive paging messages or paging indication information is signaled from the eNB to the UE using system information. Also, information on whether paging messages or paging indication can be combined or not in a cell can be signaled from the eNB to the UE on the system information.

When a cell provides wider bandwidth than that of a UE, the UE should select which part of bandwidth the UE should receive to find its own paging message. For example, if the cell provides 20 Mhz and the UE 10 Mhz only, then the UE should select which 10 Mhz the UE should receive. In one embodiment of the present invention, the UE selects based on its UE identity. Particularly, the UE select which part of bandwidth the UE should receive based on its long UE identity such as TMSI or IMSI allocated by aGW. Also, the UE selects which paging occasion the UE should monitor within one UE specific DRX cycle based on its long UE identity such as TMSI or IMSI allocated by aGW.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The present invention is applicable to such a wireless communication system as wireless Internet, mobile communication system and the like.

The invention claimed is:

1. A method of receiving a paging message at User Equipment (UE) in a wireless communication system, the method comprising:
    receiving, from a network, paging indication information including UE identification information and scheduling information for a paging channel (PCH) on which a paging message is transmitted, the scheduling information including allocation information indicating a time-frequency region through which the paging message is transmitted;
    obtaining the paging indication information when the UE identification information is identical to an identity of the UE; and
    receiving, from the network, the paging message through the time-frequency region indicated by the paging indication information.

2. The method of claim 1, wherein the UE is in a radio resource control (RRC) idle mode and the UE identification information is a long UE identity.

3. The method of claim 1, wherein the UE is in a radio resource control (RRC) connected mode and the UE identification information is a short UE identity.

4. The method of claim 1, wherein the paging indication information is received on a paging indication channel (PICH).

5. The method of claim 1, further comprising including the paging indication information in L1/2 control information to be transmitted.

6. The method of claim 1, wherein the paging indication information is received on different sub-carriers and in different time intervals.

7. The method of claim 1, wherein the paging indication information is received during a paging occasion.

8. A method of transmitting a paging message at a network in a wireless communication system, the method comprising:
    transmitting, to a User Equipment (UE), paging indication information including UE identification information and scheduling information for a paging channel (PCH) on which a paging message is transmitted, the scheduling information including allocation information indicating a time-frequency region through which the paging message is transmitted; and
    transmitting the paging message through the time-frequency region indicated by the paging indication information.

9. The method of claim 8, wherein the UE is in a radio resource control (RRC) idle mode and the UE identification information is a long UE identity.

10. The method of claim 8, wherein the UE is in a radio resource control (RRC) connected mode and the UE identification information is a short UE identity.

11. A method of receiving a paging message at a User Equipment (UE) in a wireless communication system, the method comprising:
    receiving, from a network, paging indication information including UE identification information and scheduling information for a paging channel (PCH) on which a paging message is transmitted;
    obtaining the received paging indication information when the UE identification information is identical to an identity of the UE; and
    receiving a paging message using the paging indication information by combining a plurality of paging channels from a plurality of cells,
    wherein the scheduling information includes allocation information of a time-frequency region through which the paging message is transmitted.

12. The method of claim 11, wherein the paging indication information is received from the plurality of cells, the method further comprising:
    combining the paging indication information from the plurality of cells.

13. The method of claim 11, wherein the plurality of cells are included in one tracking area (TA).

14. The method of claim 12, wherein the plurality of cells are included in one tracking area (TA).

* * * * *